Patented Apr. 3, 1923.

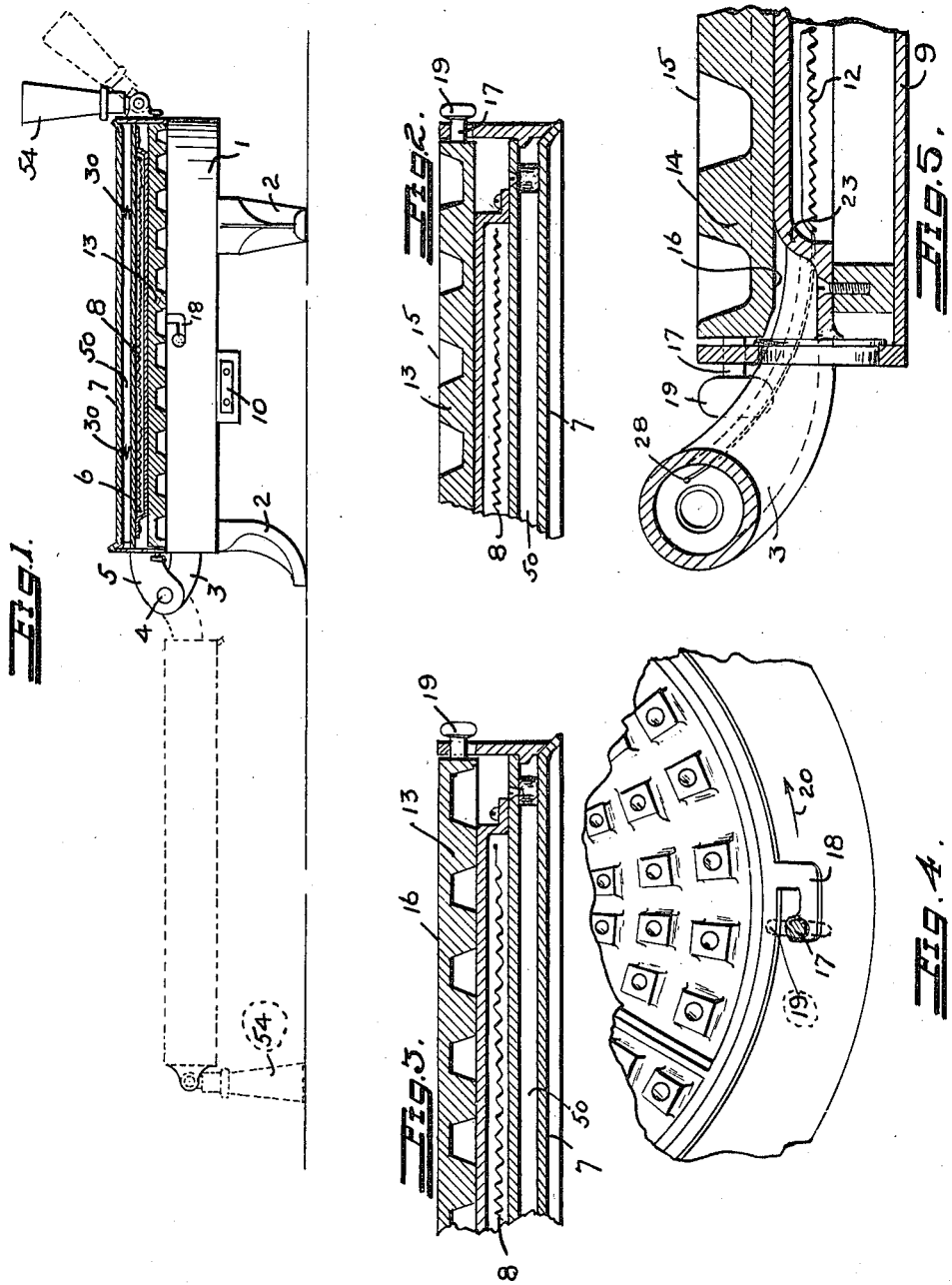

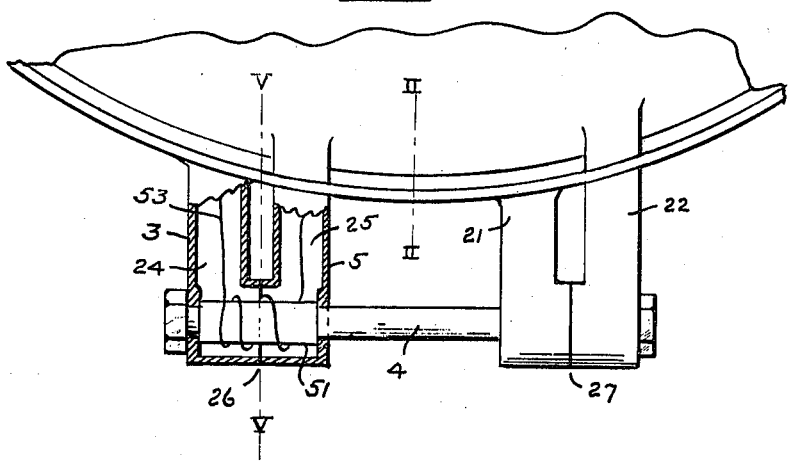
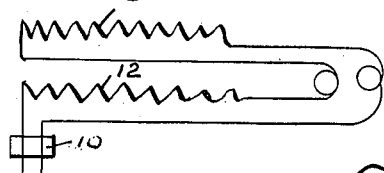
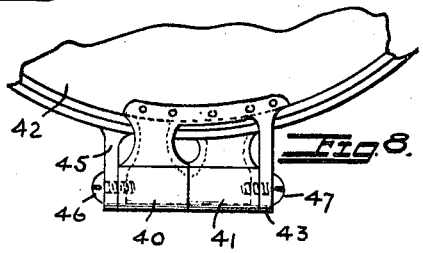
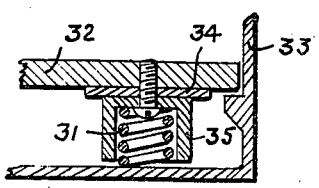
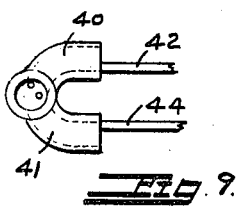

1,450,277

UNITED STATES PATENT OFFICE.

EDMUND N. BROWN AND ALFRED M. LAMBERT, OF SAN FRANCISCO, CALIFORNIA, ASSIGNORS TO MAJESTIC ELECTRIC DEVELOPMENT COMPANY, A CORPORATION OF CALIFORNIA.

WAFFLE AND HOT-CAKE IRON.

Application filed January 31, 1922. Serial No. 533,002.

*To all whom it may concern:*

Be it known that we, EDMUND N. BROWN and ALFRED M. LAMBERT, citizens of the United States, and residents of the city and county of San Francisco, State of California, have invented new and useful Improvements in Waffle and Hot-Cake Irons, of which the following is a specification.

Our invention has for its object an article of manufacture and of household utility for the frying of waffles and hotcakes or the like.

A further object is the combination in a single device of reversible plates adapted to be fixed in relation to electric heating elements in a plurality of combinations, the said combinations being adapted to accomplish a plurality of results.

A further object is a device of the character described having hinged parts, each of said parts provided with a heating element and having electrical connections entirely enclosed within the hinged members to protect them from damage or accidentally short-circuiting.

A further object is a device of the character described comprising two hinged parts, which when folded together may be employed to cook waffles between the said two parts and when unfolded on the said hinge and the cooking plates reversed provides two adjacent hot plates having a smooth surface for the cooking of hotcakes or the like.

A further object is the provision of a plate or dish warming surface enabling the operator to warm dishes thereon while the waffles are being cooked without the expenditure of additional energy.

Other objects will appear from the drawings and specification which follow.

These objects we attain by mounting a pair of electrical heating elements, and in each of the hinged members of a frame and removably mounting between the said heating elements a pair of metal plates adapted to be heated by the said element, and adapted to be readily clamped in position or removed from said frame or reversed in position adjacent to each of the heating elements.

The two parts of the frame being hinged will upon being unfolded present an upper surface of the two metallic plates adjacent to each other with the electrical heating element under each. These metallic plates in this position and with the smooth sides of the plates may be employed for cooking the ordinary hotcakes; and when the metallic or cooking plates are inverted and folded together as described below they are adapted to cook waffles therebetween and the top or upper outside surface of the frame presents a warming plate.

In a device of the character described the heating element and metallic parts surrounding the same are preferably made of iron or steel and constitute a heavy portion of the structure, whereas the cooking plates and outer frame may be made of aluminum or thin metallic plate and form a relatively light part of the structure, and in such case we prefer to from the hinges integral with the heavier parts of the machine and extending through the outer frame or casing as will be more fully set forth below.

In the employment of a device of the character described the exposure to grease, hot water, soap and the like is very frequent and where heating units are employed in such a hinged structure and it is necessary to make electrical connections to each of the heating units, such exposure of the electrical connections is very apt to result in damage and early destruction, as well as danger of fire and burning unless properly protected. This protection we accomplish by casting or securing the hinges rigidly with the heavier portions and making the said hinge parts hollow, thus providing an inclosed passage-way through which the electrical connections may be permanently established although flexible about the hinge axis. In this way the said connections are at all times thoroughly protected from damage and the user of the iron is likewise protected from shocks or burning.

On the opposite side above the upper heating units from the cooking plates and when the device is closed for cooking waffles and in spaced relation to said heating unit, and thus partly heat insulated therefrom, we provide a cover or top plate for the device useful for heating other objects as dishes, and which forms in effect a warming plate.

The upper hinged half of the device we provide with a handle so that the hinged members may be operated with facility even though hot, and this handle is formed of such dimensions and preferably with a hinge so that when the members are unfolded for cooking hotcakes the handle forms a convenient foot-rest for the upper member.

Particular attention is directed to our reversible cooking plates. These may be locked in any conventional way with the frame or heating elements but are made with one side smooth for cooking hotcakes and the other side grilled for cooking waffles, and by simply turning these plates over the device may be employed for one or the other of these operations.

Referring now to the drawings wherein similar numerals refer to identical parts.

Figure 1 is a side elevation of one form of our device showing the upper hinge member in cross section.

Fig. 2 is an enlarged cross section detail of a portion of Fig. 1 when the top has been folded out into the extended position with the cooking plate set for cooking waffles on the lines II—II of Fig. 6, with the cooking plate removed.

Fig. 3 is a fragmentary section similar to Fig. 2 except that the cooking plate has been reversed for cooking hotcakes, on the lines II—II of Fig. 6, with the cooking plate removed.

Fig. 4 shows conventional locking means for holding the cooking plate in either of its assembled positions.

Fig. 5 is an enlarged detail of the hinged portion of the lower member, showing one type of hinge connection in section on the line V—V of Fig. 6.

Fig. 6 is a plan view of the hinge of Fig. 5 in assembled position and is one of the hinges shown in cross section to better illustrate the electrical connections.

Fig. 7 is a diagrammatic showing of the electrical connections, where the heating elements are connected in series.

Figs. 8 and 9 show a modification of the hinge connection.

Fig. 10 shows one form of spring device by which the metallic contact between the heating element and cooking plate is at all times maintained and also by which the cooking plate is held locked in the frame.

Referring to Figure 1, the numeral 1 indicates the outer frame, base or lower member of our iron mounted upon the feet 2 having a hinge leaf 3, pintle 4, second hinge leaf 5 from which latter extends the upper member of the iron indicated in cross section and generally by the numeral 6. The upper and lower members of our iron are substantially similar with the exception that the upper member is provided with a warming plate 7 separated by the air space 50 from the heating unit 8 whereas in the lower member any conventional base covering, one of which is shown at 9, may be employed. At 10 is a plug connection for an electric cord or other conductor for the energizing current adapted to energize the heating units 8 and 12. These latter are shown diagrammatically and any well known type of enclosed resistance may be employed and may be connected in series or in parallel as may be desired. At 13 is one of the cooking plates adjacent to the heating unit 8 and 14 is the second plate adjacent to the heating unit 12. These plates are each provided with two surfaces, that 15 15 being adapted to cook waffles and the surface at 16 being adapted to cook hotcakes. The said cooking plates may be held in locked relation with the frames by any conventional holding means, one of which is shown in detail at 17, 18, 19, in Figs. 2, 3 and 4 and by which it will be seen that the plate 14 is supported from a plurality of projecting pins as 17 adapted to slide in the L shaped slot 18 and readily operated by the finger member 19 as desired. By shifting the member 19 in the direction of the arrow 20 of Fig. 4 either of the plates as 13 may be readily lifted from the position shown in Fig. 2, its position reversed and refixed in the frame as shown in Fig. 3. This operation has converted the device from a waffle iron to a hotcake iron, the same parts of the structure being employed in both cases. It will be seen by the diagrammatic Figure 7 that to energize the upper heating unit 8 it is necessary to provide a pair of conductors thereto which we prefer to carry through the hinge members so that the said conductors will be enclosed at all times and protected from abrasion and damage.

Referring particularly to Figs. 5 and 6 the hinge leaves 3 and 5, 21 and 22 are preferably made hollow so that the wiring connections may be passed therethrough. The several hinge leaves in their several positions are held in hinged relation by the pintle 4, preferably insulated by the tube 51, and the leaves 3 and 21 are preferably formed integral with one or more of the heavier interior parts, as for example the cast sheating for the heating unit, the lower one of which is shown at 23. This enables the electrical connections to be readily carried from the heating unit coil 12 through the hinge leaf passage-way 24 and around the pintle 4 which is preferably to be insulated and thence through the passage-way 25 into one terminal of the heating coil 8. The other terminal of the said coil 8 is likewise passed through the hinge leaves 21, 22, and back through the lower frame to the other heating unit and thence to one of the terminals at 10, the other terminal at 10 being connected to the other end of the heating unit 12 completes the circuit and enables the two heating units to be energized from the connection 10 but at all times retains the wiring completely armor encased. It will be seen that the hinge leaves 3 and 21 cast with the plate 23 are exact duplicates; i. e., from the same pattern, as the leaves 22 and 5 with the other heating unit casting or plate in the upper member, so that by machining the several hinged leaves on the faces at 26, 27, the plates are interchangeable, and the parts may be readily assembled in perfect hinged relationship by the insertion of the pintle 4.

The wiring as 53, Fig. 6, which is passed through the hinges may be insulated from the walls of the passageways 24, 25, by enameling the said pasageways or fitting sheet insulation therein, or in any other conventional way and we prefer to coil the said wire about the pintle 4, although this is not always necessary as it may be brought directly through the opening between the leaves as shown at 28, Fig. 5, if desired.

Attention is directed to the handle 54 by which the cooking plates are separated when in operation and which we prefer to hinge and which may be folded down out of the way or employed in the full line position of Fig. 1 to operate the iron or to serve as a foot when the iron is hinged open for cooking hotcakes as shown by dotted lines.

At 30, 30, Fig. 1, are shown diagrammatically compression springs by which the heating element is forced against the cooking plate and a detail showing of one arrangement of parts by which this is accomplished is indicated in Fig. 10 wherein the compression spring is shown at 31, the heating element at 32, the casing at 33 and heat insulating washer 34 and a spring sheath at 35. It will be seen that by the arrangement of the parts here shown the plate 32 is at all times forced upward by the compression spring 31 and that the high temperatures adjacent the heating plate are prevented from damaging the said spring by the heat insulation washer 34. This spring tension holds the heating element in metallic contact with the cooking plate and keeps the latter locked in the L groove 18.

Referring particularly to Figs. 8 and 9 wherein a modification of the hinging of the two members is indicated, one of the hinge leaves is shown at 40 and the second hinge leaf at 41. The leaf 40 is rigidly secured to the upper member 42 from which also extends the supplementary leaf 43, whereas the leaf 41 is rigidly connected with the member 44 with which is also connected the supplementary leaf 45. The leaves 40 and 41 are cored out as indicated by the dotted lines whereby an armor encased conduit for the electric wire connections between or to the elements is readily provided. At 46, 47 are shown pintles by which the leaves and supplementary leaves are joined in pivotal relation.

We claim:

1. A waffle and hotcake iron comprising a pair of reversible cooking plates having a plane surface on one side and a corrugated surface on the other side, a two-part hinged frame, electrical resistances secured in each of said parts, and means for securing one of said plates in each of said parts and with either of said sides adjacent the corresponding resistance.

2. A waffle and hotcake iron as set forth in claim 1, wherein each of said resistances are inclosed in a metallic sheath, hinge means between said sheaths and holding means between each of said sheaths and one of the frame parts.

3. A waffle and hotcake iron as set forth in claim 1, wherein each of said resistances are inclosed in a metallic sheath, hinge means between said sheaths and holding means between each of said sheaths and one of the frame parts, and passageways on each hinge opening into each other about the hinge axis with electrical energizing connections therethrough.

4. A waffle and hotcake iron as set forth in claim 1, wherein each of said resistances are inclosed in a metallic sheath, hinge means between said sheaths and holding means between each of said sheaths and one of the frame parts, and passageways on each hinge opening into each other about the hinge axis with electrical energizing connections therethrough, and a spring element forcing metallic contact between said sheath and the adjacent cooking plate.

5. A waffle and hotcake iron as set forth in claim 1, wherein each of said resistances are inclosed in a metallic sheath, hinge means between said sheaths and holding means between each of said sheaths and one of the frame parts, and pasageways on each hinge opening into each other about the hinge axis with electrical energizing connections therethrough, and a spring element forcing metallic contact between said sheath and the adjacent cooking plate, and locking the said plate in place when the securing means is engaged.

6. A waffle and hotcake iron comprising a pair of reversible cooking plates having a plane surface on one side and a corrugated surface on the other side, a two-part hinged frame, electrical resistances secured in each of said parts, and means for securing one of said plates in each of said parts and with either of said sides adjacent the corresponding resistance and a handle for one of the parts positioned opposite the hinge and constructed and adapted to serve as a foot when the hinged parts are opened out.

7. A waffle and hotcake iron as set forth in claim 1, wherein each of said resistances are inclosed in a metallic sheath, hinge means between said sheaths and holding means between each of said sheaths and one of the frame parts, and passageways on each hinge opening into each other about the hinge axis with electrical energizing connections therethrough and a handle for one of the parts positioned opposite the hinge and constructed and adapted to serve as a foot when the hinged parts are opened out.

8. A waffle and hotcake iron as set forth in claim 1, wherein each of said resistances are inclosed in a metallic sheath, hinge means between said sheaths and holding means between each of said sheaths and one of the frame parts, and passageways on each hinge opening into each other about the hinge axis with electrical energizing connections therethrough, and a spring element forcing metallic contact between said sheath and the adjacent cooking plate and a handle for one of the parts positioned opposite the hinge and constructed and adapted to serve as a foot when the hinged parts are opened out.

9. A waffle and hotcake iron as set forth in claim 1, wherein each of said resistances are inclosed in a metallic sheath, hinge means between said sheaths and holding means between each of said sheaths and one of the frame parts, and passageways on each hinge opening into each other about the hinge axis with electrical energizing connections therethrough, and a spring element forcing metallic contact between said sheath and the adjacent cooking plate, and locking the said plate in place when the securing means is engaged, and a handle for one of the parts positioned opposite the hinge and constructed and adapted to serve as a foot when the hinged parts are opened out.

10. In a cooking device comprising a pair of frame parts each provided with a heating resistance and a cooking plate, a hinge joint of two parts each having a hollow passage therethrough, said passages opening into each other about the axis of the hinge joint.

11. In a cooking device comprising a pair of frame parts each provided with a heating resistance and a cooking plate, a hinge joint of two parts each having a hollow passage therethrough, said passages opening into each other about the axis of the hinge joint, and passage ways in each hinge opening into each other about the hinge axis with electrical energizing connections therethrough.

12. In a cooking device comprising a pair of frame parts each provided with a heating resistance and a cooking plate, a hinge joint of two parts each having a hollow passage therethrough, said passages opening into each other about the axis of the hinge joint and spring means forcing contact between each of said cooking plates and its corresponding heating resistance.

13. In a cooking device comprising a pair of frame parts each provided with a heating resistance and a cooking plate, a hinge joint of two parts each having a hollow passage therethrough, said passages opening into each other about the axis of the hinge joint and adapted to hold said plate in locked relation with the corresponding frame part.

EDMUND N. BROWN.
ALFRED M. LAMBERT.